(12) United States Patent
Townsend

(10) Patent No.: US 9,861,922 B1
(45) Date of Patent: Jan. 9, 2018

(54) MATING INTERFACE BETWEEN AIR INTAKE HOUSING AND AIR FILTER

(71) Applicant: Holley Performance Products Inc., Bowling Green, KY (US)

(72) Inventor: Ethan C. Townsend, Rockfield, KY (US)

(73) Assignee: Holley Performance Products, Inc., Bowling Green, KY (US)

( * ) Notice: Subject to any disclaimer, the term of this patent is extended or adjusted under 35 U.S.C. 154(b) by 0 days.

(21) Appl. No.: 15/293,410

(22) Filed: Oct. 14, 2016

(51) Int. Cl.
   *B01D 46/00* (2006.01)
   *F02M 35/024* (2006.01)
   *F02M 35/02* (2006.01)
   *B01D 46/24* (2006.01)

(52) U.S. Cl.
   CPC ..... *B01D 46/0005* (2013.01); *B01D 46/2403* (2013.01); *F02M 35/0201* (2013.01); *F02M 35/02416* (2013.01); *F02M 35/02483* (2013.01); *B01D 2265/024* (2013.01); *B01D 2279/60* (2013.01)

(58) Field of Classification Search
   None
   See application file for complete search history.

(56) References Cited

U.S. PATENT DOCUMENTS

| | | | | |
|---|---|---|---|---|
| 4,969,994 A * | 11/1990 | Misgen | ............... | B01D 27/08 210/232 |
| 5,547,480 A * | 8/1996 | Coulonvaux | ...... | B01D 46/0001 55/498 |
| 6,554,140 B2 * | 4/2003 | Steger, Jr. | ............... | B01D 27/08 210/438 |
| 6,726,735 B1 * | 4/2004 | Oussoren | ........... | B01D 46/0005 210/473 |
| 7,294,163 B1 * | 11/2007 | LaCroix | ............. | B01D 46/0005 55/378 |
| 7,645,329 B2 * | 1/2010 | Niakan | ............... | B01D 46/0036 55/385.3 |
| D749,134 S | 2/2016 | Niakan et al. | | |
| 9,440,175 B2 | 9/2016 | Niakan et al. | | |
| 2005/0166561 A1 * | 8/2005 | Schrage | ............. | B01D 46/0001 55/498 |
| 2006/0157403 A1 * | 7/2006 | Harder | ................. | B01D 27/005 210/445 |

(Continued)

OTHER PUBLICATIONS

"Definition of Press Fit", Captured May 4, 2017, Mirriam Webster, all pages, https://www.merriam-webster.com/dictionary/press%20fit.*

*Primary Examiner* — Amber R Orlando
*Assistant Examiner* — Britanny Precht
(74) *Attorney, Agent, or Firm* — Middleton Reutinger

(57) ABSTRACT

Mating interfaces between an air intake housing and an air filter are disclosed. According to one embodiment, an air filter assembly having a mating interface for coupling an air intake housing to the air filter may include an air filter having an exterior, an interior, and outlet; and a mating interface coupled to a circumference of the outlet of the air filter. The mating interface may include an opening for receiving an end of an air tube that is in communication with the interior of the air filter; and a groove in a surface of the mating interface for press-fit receiving a first opening an air filter housing that surrounds the air filter.

11 Claims, 5 Drawing Sheets

(56) References Cited

U.S. PATENT DOCUMENTS

| | | | | |
|---|---|---|---|---|
| 2006/0260469 A1* | 11/2006 | Miyagishima | ..... | B01D 46/0005 |
| | | | | 95/273 |
| 2009/0094951 A1* | 4/2009 | Baseotto | ............ | B01D 46/0024 |
| | | | | 55/498 |
| 2010/0037570 A1* | 2/2010 | Osendorf | ........... | B01D 46/0004 |
| | | | | 55/355 |
| 2011/0197556 A1* | 8/2011 | Brown | ................. | B01D 46/527 |
| | | | | 55/498 |
| 2013/0091811 A1* | 4/2013 | Morgan | ............. | B01D 46/0005 |
| | | | | 55/341.1 |
| 2013/0305672 A1* | 11/2013 | Adkins | .............. | B01D 46/2411 |
| | | | | 55/498 |
| 2014/0116015 A1 | 5/2014 | Niakan et al. | | |
| 2014/0260144 A1* | 9/2014 | Williams | ........... | B01D 46/0005 |
| | | | | 55/502 |
| 2014/0373494 A1* | 12/2014 | Lepine | ............... | B01D 46/2414 |
| | | | | 55/502 |

\* cited by examiner

US 9,861,922 B1

MATING INTERFACE BETWEEN AIR INTAKE HOUSING AND AIR FILTER

BACKGROUND OF THE INVENTION

1. Field of the Invention

The present invention generally relates to mating interfaces between an air intake housing and an air filter.

2. Description of the Related Art

Air filters are an important part of a vehicle. Air filters ensure that clean air reaches the engine. Without an air filter, the air induction system would become full of bugs, leaves, dirt and other debris and damage the engine.

Air filters are generally installed in a housing. The housing may be fastened together with screws, clips, clamps, or wing nuts.

SUMMARY OF THE INVENTION

Mating interfaces between an air intake housing and an air filter are disclosed. According to one embodiment, an air filter assembly having a mating interface for coupling an air intake housing to the air filter may include an air filter having an exterior, an interior, and outlet; and a mating interface coupled to a circumference of the outlet of the air filter. The mating interface may include an opening for receiving an end of an air tube that is in communication with the interior of the air filter; and a groove in a surface of the mating interface for press-fit receiving a first opening of an air filter housing that surrounds the air filter.

In one embodiment, the mating interface may include a second groove in the surface.

In one embodiment, the opening may include a screw thread.

In one embodiment, the mating interface may include polyurethane.

In one embodiment, the groove comprises a draft.

In one embodiment, the groove may include a rib.

In one embodiment, the mating interface may include a flange between the groove and the opening, and the end of the air tube may press the flange against the air filter housing.

In one embodiment, the air filter may have a cone shape, a cylindrical shape, etc.

In one embodiment, the air filter housing may include a second opening for receiving an air flow of unfiltered air.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein are directed to mating interfaces between an air intake housing and an air filter.

Although embodiments may be described in the context of an air induction system for a motor vehicle, it should be recognized that the disclosure has applicability in any system that may use a filter to filter gasses or liquids. For example, the disclosure may be used with vacuums, gas supply systems, etc.

Figure 1:
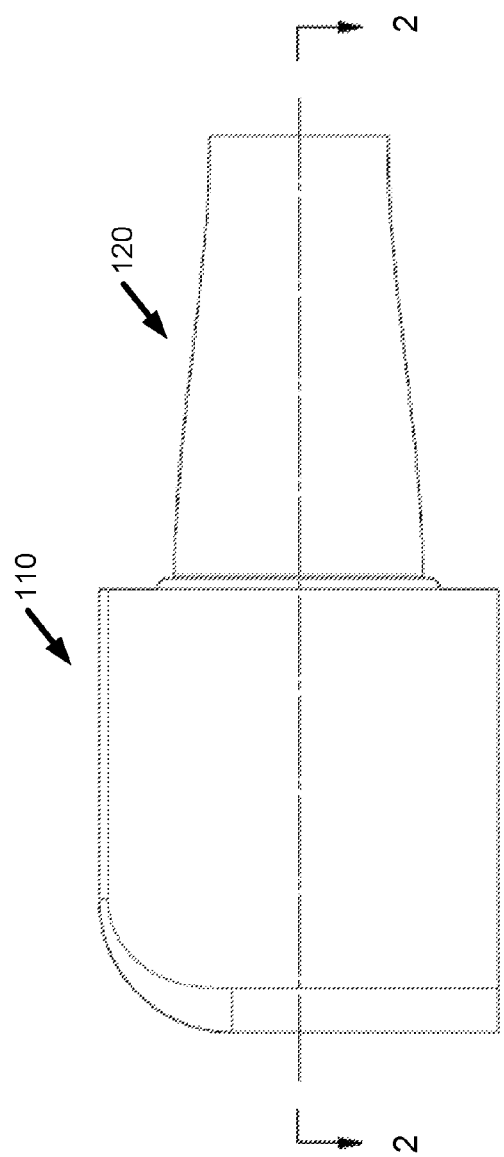
FIG. 1 depicts a housing and mating interface between an air intake housing and an air filter according to one embodiment.
Figure 2:
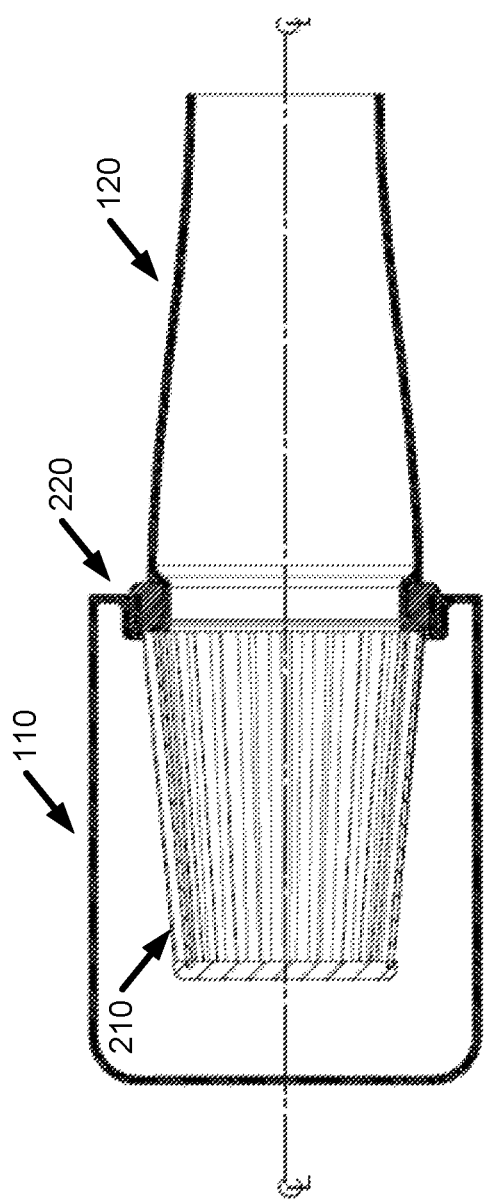
FIG. 2 depicts a section view of FIG. 1.
Figure 4:
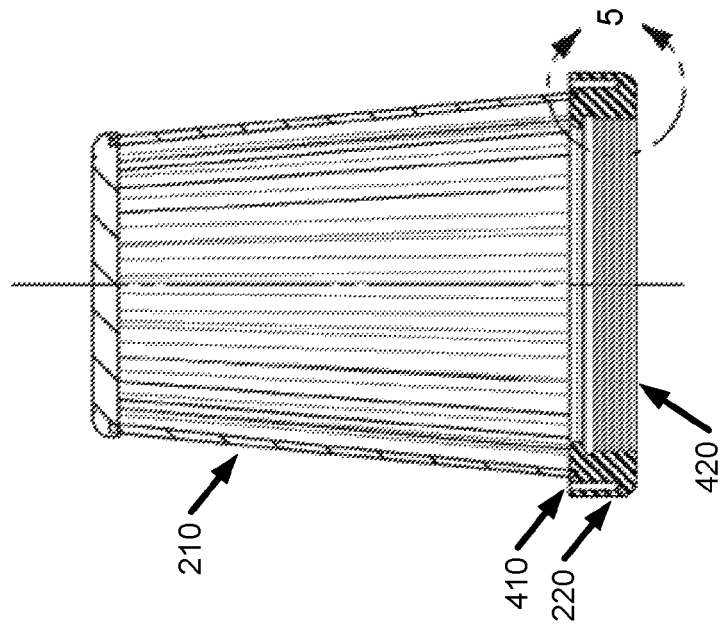
FIG. 4 depicts a section view of FIG. 3.
Figure 3:
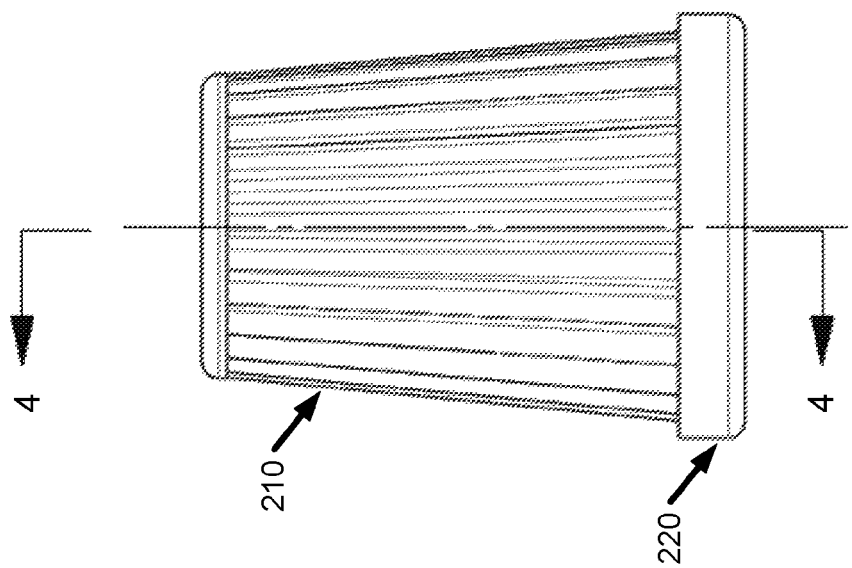
FIG. 3 depicts an air filter with a mating interface according to one embodiment.
Figure 5:
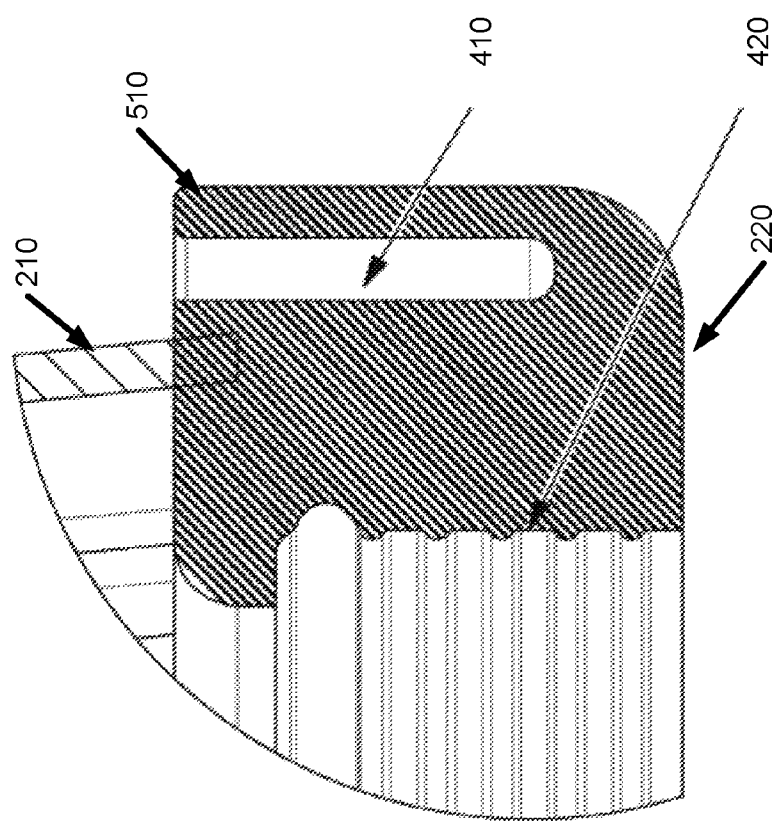
FIG. 5 depicts a detailed view of a portion of the mating interface of FIG. 4.

FIGS. 1 and 2 depict a housing and mating interface between an air intake housing and an air filter according to one embodiment. Air intake housing 110 may be any suitable air intake housing, and may be made out of metal, plastic (e.g., injection or rotationally molded plastic), etc.

Air intake housing 110 may have any suitable shape to surround air filter 210. In one embodiment, air intake housing 110 may include an opening (not shown) for receiving incoming air that is to be filtered by the air filter.

Air filter 210 may be mounted on air tube 120 using, for example, a clamp (not shown), by screw threads, by friction, using ribs, or any other suitable mechanism. Air tube 120 may supply air filtered by air filter 210 to the engine.

Air filter 210 may have any suitable shape, size, etc. Although air filter 210 is depicted as a cone air filter, other shapes and sizes, such as round, oval, tapered, etc. may be used as necessary and/or desired.

Air filter 210 may include mating interface 220, which couples air intake housing 110 to air filter 210. Mating interface 220 may be made of any suitable material or combinations of materials, including polyurethane, any durometer of rubber, plastic, etc. In one embodiment, a harder material, such as steel, aluminum, harder plastic, fiberglass, nylon, may be molded inside mating interface 220 for additional strength.

Referring to FIGS. 3-6, air filter 210 with mating interface 220 is depicted according to one embodiment. In one embodiment, air filter 210 may include opening 420 for receiving air tube 120.

In one embodiment, groove 410 may be provided in mating interface 220 for receiving an end of air filter housing 110. In one embodiment, groove 410 may be provided along the circumference of mating interface 220. In one embodiment, mating interface 220 and air filter housing 110 may couple in a "press-fit" fashion such that no external fasteners (e.g., clamps, clips, foam/rubber seal trim, etc.) are required.

Groove 410 may have any suitable shape or orientation. For example, groove 410 may be wide, narrow, shallow, or deep. It may have draft or no draft. It may have internal ribs, or no ribs. It may have screw threads. In one embodiment, a second groove (not shown) may be provided.

In one embodiment, the insertion of air intake tube 120 into air filter 210 may contribute to the function of the assembly by pressing or pinching flange 510 of mating interface 220 between air intake tube 120 and air intake housing 110.

Figure 6:
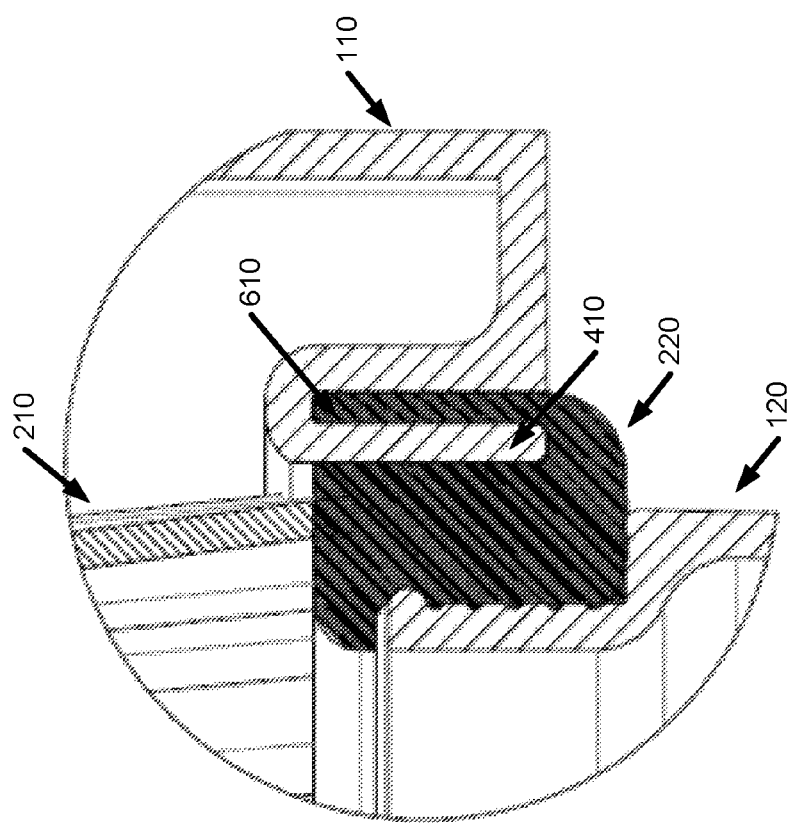
FIG. 6 depicts a detailed view of a portion of the mating interface of FIG. 4 including an air filter housing.

In one embodiment, as depicted in FIG. 6, air filter housing 110 may include female channel 610 that may receive flange 510 of mating interface 220.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

It should be recognized that although several embodiments have been disclosed, these embodiments are not exclusive and aspects of one embodiment may be applicable to other embodiments.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. An air filter assembly, comprising:
    an air filter having an exterior, an interior, and outlet;
    a mating interface coupled to a circumference of the outlet of the air filter, comprising:
        an opening which receives an end of an air tube that is in communication with the interior of the air filter; and
        a circumferential groove in a surface of the mating interface, said circumferential groove disposed radially outward of said opening, a flange of an air filter housing that surrounds the air filter wherein said flange of the air filtering housing is linearly press fit received within said circumferential groove, and a flange of the mating interface which extends adjacent to the circumferential groove, said circumferential groove and said flange of the mating interface extending in a direction coaxial to said opening.

2. The air filter assembly of claim 1, wherein the mating interface comprises a second groove in the surface.

3. The air filter assembly of claim 1, wherein the opening comprises a screw thread.

4. The air filter assembly of claim 1, wherein the mating interface comprises polyurethane.

5. The air filter assembly of claim 1, wherein the groove comprises a draft.

6. The air filter assembly of claim 1, wherein the groove comprises a rib.

7. The air filter assembly of claim 1, wherein the mating interface comprises the circumferential groove between the flange of the mating interface and the opening, and the end of the air tube presses the flange of the mating interface against the air filter housing.

8. The air filter assembly of claim 1, wherein the air filter has a cone shape.

9. The air filter assembly of claim 1, wherein the air filter has a cylindrical shape.

10. The air filter assembly of claim 1, wherein the air filter housing comprises a second opening for receiving an air flow of unfiltered air.

11. The air filter assembly of claim 1, wherein the groove is substantially coaxial with the air filter opening.

* * * * *